(12) United States Patent
Bai et al.

(10) Patent No.: US 9,244,960 B2
(45) Date of Patent: Jan. 26, 2016

(54) METADATA-DRIVEN VERSION MANAGEMENT SERVICE IN PERVASIVE ENVIRONMENT

(71) Applicant: International Business Machines Corporation, Armonk, NY (US)

(72) Inventors: Kun Bai, Elmsford, NY (US); David L. Cohn, Dobbs Ferry, NY (US); Hani T. Jamjoom, Cos Cob, CT (US); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 13/837,008

(22) Filed: Mar. 15, 2013

(65) Prior Publication Data

US 2014/0279904 A1    Sep. 18, 2014

(51) Int. Cl.
*G06F 17/30* (2006.01)

(52) U.S. Cl.
CPC ...... *G06F 17/30309* (2013.01); *G06F 17/3023* (2013.01)

(58) Field of Classification Search
CPC ............ G06F 17/30309; G06F 17/3023

USPC .......................................... 707/638
See application file for complete search history.

(56) References Cited

U.S. PATENT DOCUMENTS

| | | | |
|---|---|---|---|
| 7,177,865 B2 | 2/2007 | Sasaki et al. | |
| 7,386,532 B2 | 6/2008 | Kiessig et al. | |
| 7,647,361 B2 | 1/2010 | Thornton et al. | |
| 8,023,934 B2 | 9/2011 | Jeide et al. | |
| 8,095,509 B2 | 1/2012 | Satya Sudhakar | |
| 2007/0208782 A1* | 9/2007 | Carter et al. | 707/201 |
| 2008/0049714 A1 | 2/2008 | Commarford et al. | |
| 2008/0250024 A1* | 10/2008 | Kvm et al. | 707/10 |
| 2009/0132606 A1 | 5/2009 | Cha et al. | |
| 2009/0248757 A1 | 10/2009 | Havewala et al. | |
| 2010/0235434 A1 | 9/2010 | Henders et al. | |
| 2013/0262392 A1* | 10/2013 | Vibhor et al. | 707/654 |

\* cited by examiner

*Primary Examiner* — Huawen Peng
(74) *Attorney, Agent, or Firm* — Scully, Scott, Murphy & Presser, P.C.; Louis J. Percello, Esq.

(57) ABSTRACT

Metadata driven version management service determines one or more version operations to perform based on the properties of a device, computing environment and metadata associated with a file being versioned. The version management service allows different devices to perform different version operations based on different device properties.

8 Claims, 8 Drawing Sheets

METADATA-DRIVEN VERSION MANAGEMENT SERVICE IN PERVASIVE ENVIRONMENT

FIELD

The present application relates generally to computers, and computer applications, and more particularly to version management of data in pervasive environment.

BACKGROUND

Pervasive environment includes a collection of mobile, desktop devices, workstations (e.g., at office, home, etc), laptop, tablet, smart phone, and other such devices. A variety of files needs to be managed in pervasive environments for multiple-devices, e.g., not just text file, but rich text documents, photos, music, videos, etc. In addition, there are many versions of the same files as those files are frequently being updated or changed. Ideally, one would like to keep all the versions; always pre-fetch versions to local storage before user access them; and always backup all versions to multiple locations to provide higher availability. However, such ideal provisions are costly and may not provide an efficient solution.

Known systems such as DROPBOX provide file repository which keeps only the latest version and synchronizes files for every device, i.e., files are duplicated in every devices. Another known system such as ICLOUD provides an application data repository for system built-in applications only and maintains the same data in all devices, regardless of the usage of the data.

While synchronizing a modified file of a device on all other devices may maximize the file availability, such mechanism does not consider other aspects such as the ability to rollback to earlier version, battery and bandwidth for best usage of mobile devices, whether the synchronized data has usage on all the devices (e.g., some data may not have any usage on certain device as in an example case where a mobile device might not have a player for some format of multimedia data).

BRIEF SUMMARY

A method for metadata driven version management service, in one aspect, may comprise accessing a file used in pervasive computing environment for synchronizing, by a given universal identification and storage location of the file. The method may also comprise extracting metadata associated with the file. The method may further comprise determining whether to synchronize by keeping a delta of the file locally at a device being synchronized or by keeping a whole copy of the file locally at the device being synchronized or by keeping both, based on the metadata associated with the file, one or more properties associated with the device being synchronized and one or more characteristics of the pervasive computing environment. The method may further comprise determining one or more version operations based on the determining of whether to synchronize by keeping the delta of the file locally at the device being synchronized or by keeping the whole copy of the file locally at the device being synchronized. The method may also comprise performing the one or more version operations for synchronizing the file at the device being synchronized.

A system for metadata driven version management service, in one aspect, may comprise a version management module operable to execute on a processor, and further operable to access a file used in pervasive computing environment for synchronizing, by a given universal identification and storage location of the file. The version management module may be further operable to extract metadata associated with the file. The version management module may be further operable to determine whether to synchronize by keeping a delta of the file locally at a device being synchronized or by keeping a whole copy of the file locally at the device being synchronized or by keeping both, based on the metadata associated with the file, one or more properties associated with the device being synchronized and one or more characteristics of the pervasive computing environment. The version management module may be further operable to determine one or more version operations based on the determining of whether to synchronize by keeping the delta of the file locally at the device being synchronized or by keeping the whole copy of the file locally at the device being synchronized or both. The version management module may be further operable to perform the one or more version operations for synchronizing the file at the device being synchronized.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
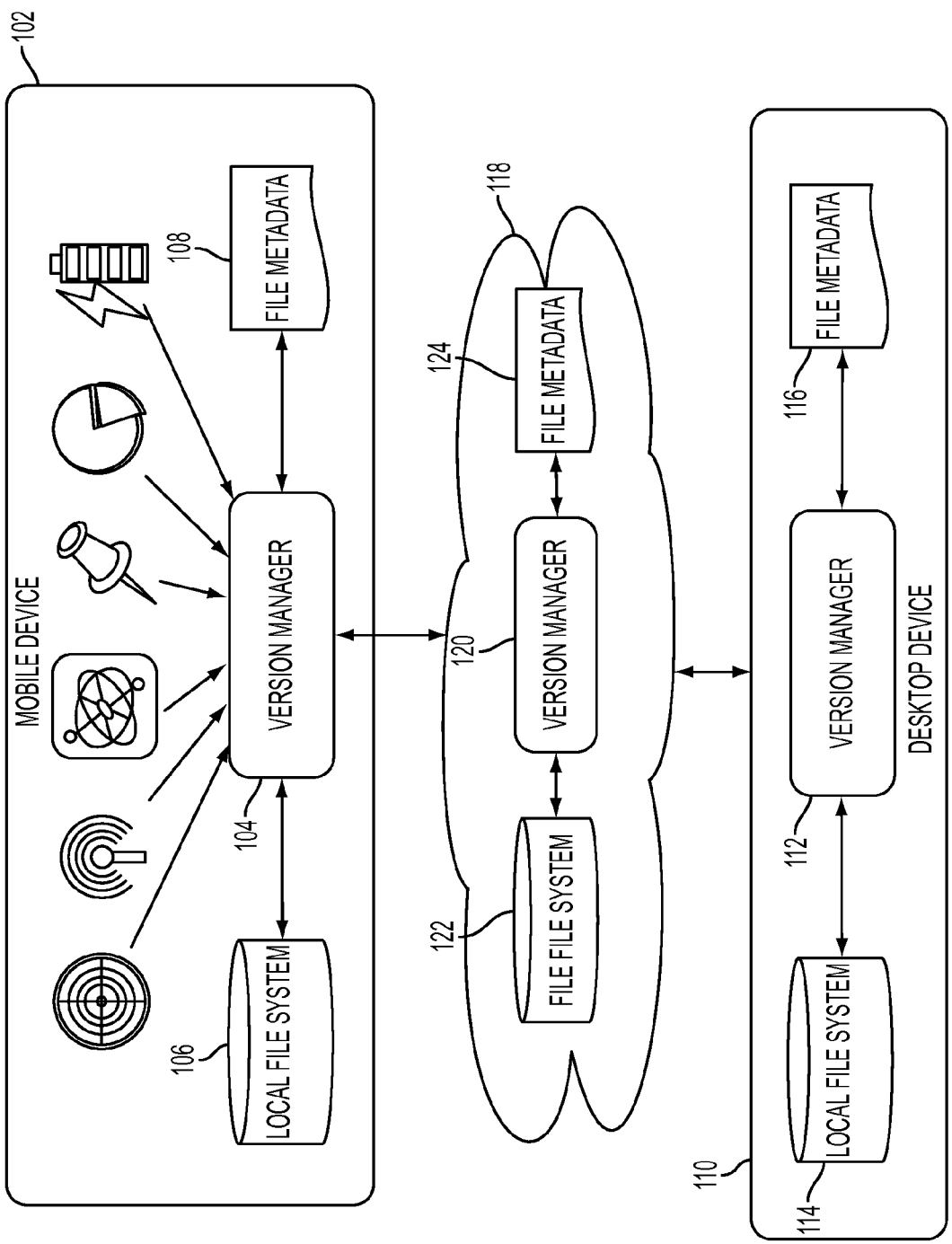
FIG. 1 illustrates system architecture in one embodiment of the present disclosure.

A unified file version management service among devices may be provided. In one embodiment of the present disclosure, a metadata driven version management service and a methodology thereof, may comprise accessing a file by assigning or giving a universal identification (id) of, and location of a copy of file, extracting and maintaining metadata of file, wherein metadata may contain type of file content, versions and related deltas, size, ownership, provenance, redundancy of files, and/or other information about the file. Briefly, delta or delta file only includes the current changes made to a file or data. Thus, delta comprises a portion that has changed from the previous content. A decision may be made of whether to keep a delta, a complete file, or both, on the file in response to the file being updated or changed. A decision may be made of what version operation should be performed in which devices, wherein operations may include download/upload a delta, download/upload a complete copy, and provision/de-provision. A decision may be made on when an operation should be performed, for example, by considering one or more properties or attributes of devices (e.g., location, battery capacity, etc.), network bandwidth, and cost of data transportation. One or more version management operations may be performed based on the determined decisions.

Version management operations in pervasive environment generally comprise creating a new version, uploading and/or downloading, provisioning and/or de-provisioning, and summarization which may perform partial synchronizing. Creating a new version, e.g., may include creating a new copy of a file or data that is a complete copy of the most updated version, or creating an old copy with delta (i.e., only the changes). Uploading may include uploading a complete copy version or the delta to other devices and/or a central repository. Downloading may include downloading a complete copy version or the delta to one or more other devices' local storage. Provisioning and/or de-provisioning may handle security issues, e.g., when devices are in an unsecure network, confidential files may be made inaccessible (e.g., deprovisioned). In a secure network, some contents may be made accessible (e.g., provisioned). Summarization may include uploading and/or downloading a summary of a file version, e.g., first few lines of email, one or more screen shots of video file, first few minutes of audio file, etc.

In one aspect, the decisions that are provided automatically in one embodiment of the present disclosure may include whether to maintain delta or complete copy of a file (or another representation of data), e.g., whether to maintain delta (changes) only or create a new complete copy when a new version is created. Another decision that may be provided automatically in one embodiment of the present disclosure may include a decision on what operation is required. This decision may be made, e.g., based on an understanding of the file usage pattern in a target device. For example, a decision may be made to download the file only when there is potential usage in the target device. This decision may be made, e.g., also based on understanding the risk of losing the file. For example, a decision may be made to upload to other devices as soon as possible if it is single copy on a mobile device (e.g., no backup copies available). As another example, a decision may be made to remove (deprovision) the file that contains confidential information when the device(s) is in insecure environment, e.g., network is not protected.

Yet another decision that may be provided automatically in one embodiment of the present disclosure may include deciding when an operation should be executed. For example, to be cost effective, a decision may be made to schedule a file download before leaving WIFI environment. A decision on when an operation should be executed also may be based on understanding the network bandwidth, power/battery capacity, etc., in a target device. For example, an operation may be triggered only when an appropriate network bandwidth and/or power (battery) capacity are available.

FIG. 1 illustrates system architecture in one embodiment of the present disclosure. A version manager of the present disclosure in one embodiment may be deployed in various devices. For example, a mobile device 102 may include a version manager 104 that handles version management of the files stored in the local file system 106 of the mobile device. The mobile device 102 also contains a metadata file 108 associated with the files stored in its local file system 106. The methodology of the present in one embodiment may create the metadata file 108 by examining the data and information associated with the files stored in the local file system 106.

Similarly, a desktop device 110 may include a version manager 112 of the present disclosure, for managing files stored in a local file system 114 of the desktop device 110. Metadata file 116 stored information associated with the files stored in the local file system 114 of the desktop device 110.

A version manager 120 of the present disclosure may also be deployed at a network level, for example, on a server 118. The version manager 120 may manage files stored in the file system 122 of the server 118, and may also include metadata file 124 associated with the files in the file system.

The version managers 104, 112 and 118 are instances of the same unified version manager of the present disclosure. However, those version managers 104, 112, 118 may behave differently and perform different functions or operations based on the context and environment, e.g., the properties of the specific device on which a version manager is deployed and whose files it is managing, network conditions and properties, specific properties or attributes of a specific file it is managing.

Metadata 108, 116, 124 for example, may provide information associated with a file such as the size, ownership, provenances, type of content (e.g., whether audio, video, text, and/or other), update content, update frequency, update initiators, etc., redundancy (e.g., how many copies of the file are stored and where), who has a copy on which device, version information, and others. Provenance describes how an object (file) came to be in its present state. Thus, it describes the evolution of the object (file) over time. In addition, the methodology of the present disclosure may include automatically maintaining the metadata.

Both in desktop and mobile devices, input to a version manager of the present disclosure (e.g., 104, 112) may include metadata of files, information such as context/situation, user's activity pattern, daily agenda, user's preference, and other information. The context/situation may be detected by one or more sensors of the device. For example, a mobile device may detect its battery charge level, its network bandwidth, its location (e.g., by a global positioning system device or the like). In one aspect, the methodology of the present disclosure may provide for optimal version management operation that is cost effective. For example, the version manager may minimize battery consumption while maximizing the chance of local file access for applications. The version manager may also provide for cost effective bandwidth utilization by performing appropriate versioning operations. In another aspect, maximal file availability may be provided while conforming to security and privacy policy. A file may be pre-fetched to local storage in advance, e.g., when appropriate to leverage network availability. In yet another aspect, the different operations that a version manager of the present disclosure perform based on different context and properties may be transparent to end users, i.e., hidden from the end users. Thus, the end user may only see the effectiveness or the result.

Figure 2:
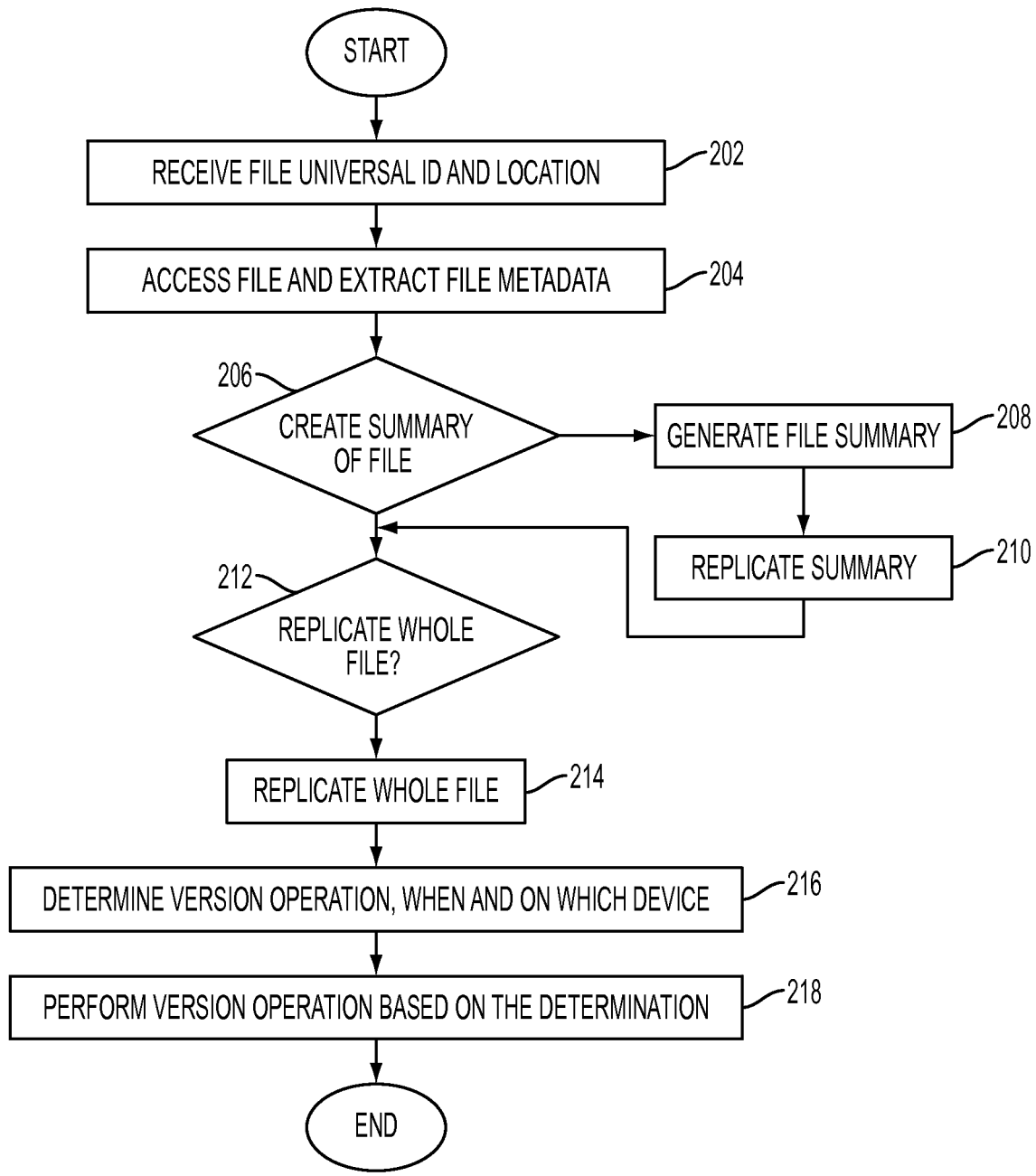
FIG. 2 is a flow diagram illustrating a method of automatic version management of the present disclosure in one embodiment.

FIG. 2 is a flow diagram illustrating a method of automatic version management of the present disclosure in one embodiment. The method in one embodiment provides metadata driven version management services. At 202, a universal identification or identifier (ID) associated with a file that is being versioned (e.g., saved with updates) and the location of the file is received. The universal identification may be like a universally unique identifier (UUID). The file, e.g., is used in pervasive computing environment. The location of the file is where the file is currently stored and being updated, e.g., location at which the file is changed, and from where it needs to be synchronized, e.g., with the same updates or copy of the file in other devices. The file, for example, is updated at one mobile device, and needs to be synchronized at different mobile devices that have their local copy of the file.

At 204, the file is accessed from the location, by using the given or received universal identification and storage location of a copy of the file, and metadata associated with the file is extracted. The metadata may include a type of file content, one or more versions and related deltas, size, ownership, provenance, and redundancy of the files.

The method may include determining whether to synchronize by keeping a delta of the file locally at a device (being synchronized with the update) or by keeping the whole file locally at the device (being synchronized with the update), based on the metadata (extracted at 204) associated with the file and one or more characteristics of the pervasive computing environment. For example, at 206, it is determined whether a summary of the file should be created, and in response to determining that the summary of the file is to be created, a file summary is generated at 208 and the file summary is replicated at 210. This determination, for example, considers the characteristics of the network, pervasive computing environment, the network in which the mobile devices are running, and the properties or characteristics of a mobile device whose local file is being synchronized. At 212, it is determined whether to replicate the whole file, e.g., based on the storage location and the metadata, and in response to determining that the whole file is to be replicated, the whole file is replicated at 214.

In one aspect, the determinations at 206 and 212 may be made per device whose file is being synchronized. Thus, even when the same file is being synchronized among a number of different devices, there may be a different determination or decision made for the different devices based on their characteristics.

At 216, the method may also include determining what type of version operation to perform, for which device. Thus, for different devices being synchronized with the same file, different version operation may be selected automatically based on different characteristics associated with those different devices. The version operations, for example, may include downloading/uploading a delta or a complete copy of a file, and/or provisioning or de-provisioning. The decision or determination also may be made as to when an operation should be performed on which device according to one or more properties of that device (e.g., location, current battery charge level, battery capacity, etc.), network bandwidth, and/or cost of data transportation.

At 218, one or more operations may be performed, e.g., based on the determining of whether to synchronize by keeping a delta of the file locally at a device or by keeping the whole file locally at the device.

Figure 3:
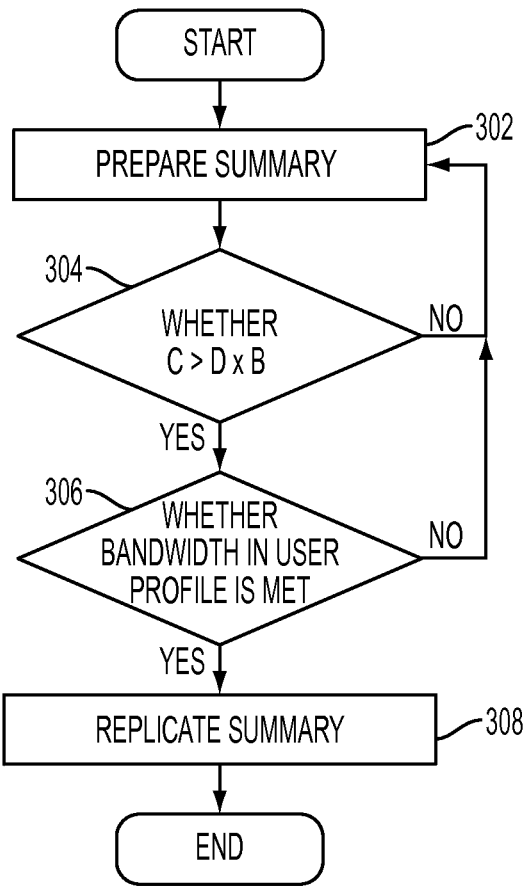
FIG. 3 is a flow diagram that illustrates a method for preparing a summary in one embodiment of the present disclosure.

FIG. 3 is a flow diagram that illustrates a method for determining when or whether to replicate a summary in one embodiment of the present disclosure. This process determines whether a summary should be kept (copied to) in a device that is being synchronized. The same process may be also used to determine whether only a delta should be kept (copied to) in the device that is being synchronized. At 302, the file summary is prepared. For example, each file in a modern file system has a series of attributes (or metadata, e.g., size, ownership, media type, etc.) associated with it. This is referred to as "summary." In preparing the file summary, such file attributes (metadata) are extracted. At 304, a computation is performed, using a formula, to determine automatically whether to replicate the summary of the file, for example, copy the summary to a mobile device whose file is being synchronized. The formula may test for whether: [file size (bit)/bandwidth (bits per second (bps))]*power consumption per bit=C, is greater than a configurable parameter D multiplied by the current battery power (expressed as B). In the above formula, the "file size" is the size of the summary file. The "bandwidth" is best available transmission rate provided by mobile device at the current time. The "power consumption per bit" is the amount of power the device will use to transmit a bit; power consumption may be different from device to device, and can be provided by the device at the current time. "*" denotes a multiplication operation (in another embodiment, another operation may be utilized). An example value for the configurable parameter D may be, D=10%. A user, for example, may pre-configure this value in the user's profile, e.g., based on the user preference. If at 304, C>D×B, it is determined at 306 whether the bandwidth (a value specified by user) in a user profile is met. This bandwidth may be another value that is pre-configured in the user profile, e.g., based on the user preference. If at 304 C is not greater than D×B, a determination is made that the summary should not be replicated at this time. The method then returns to 302, where the process waits for the next case for another determination.

If at 306, the bandwidth in user profile is met, at 308, the summary is replicated on the mobile device whose file is being synchronized. Otherwise, the method returns to 302.

Figure 4:
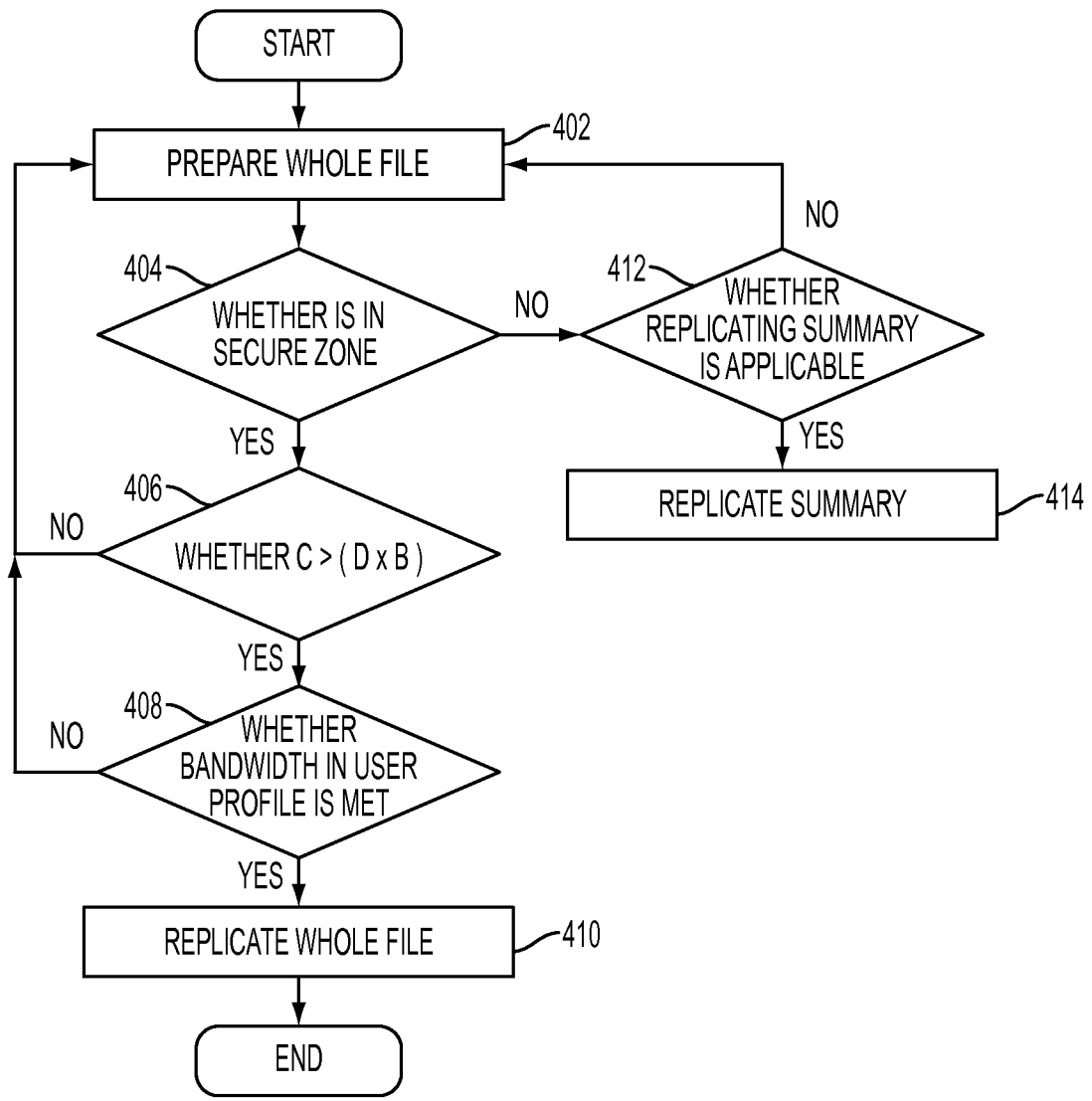
FIG. 4 is a flow diagram illustrating a method for preparing a whole file in one embodiment of the present disclosure.

FIG. 4 is a flow diagram illustrating a method for determining whether to replicate a whole file in one embodiment of the present disclosure. At 402, the file is prepared, for example, checked to verify that the file includes the updated components or portions, and is the latest whole file. File compression may be applied to the file, if desired, to compress the file and make it smaller in size. At 404, it is determined whether the device whose local file is being synchronized (e.g., being synchronized with the latest updates made to the same file (copy of the same file) at another device) is in a secure zone, e.g., protected with encryption or other mechanism so that the data being transferred from and to the device cannot be intercepted easily. If it is determined at 404 that the device is in secure zone, at 406, it is determined whether a criterion is met. This criterion, for example, tests whether: [file size (bit)/bandwidth (bits per second (bps))]*power consumption per bit=C, is greater than a configurable parameter D multiplied by the current battery power (expressed as B). In the above formula, the "file size" is the size of the whole file. The "bandwidth" is best available transmission rate provided by mobile device at the current time. The "power consumption per bit" is the amount of power the device will use to transmit a bit; power consumption may be different from device to device, and can be provided by the device at the current time. An example value for the configurable parameter D may be, D=10%. A user, for example, may pre-configure this value in the user's profile, e.g., based on user preference. If so, at 408, it is determined whether the bandwidth (a user specified value) in user profile is met. This bandwidth may be another value that is pre-configured in the user profile, e.g., based on user preference. If so, at 410, the whole file is replicated on the mobile device whose file is being synchronized. Otherwise, it is determined that the whole file should not be replicated, and the method returns to 402, where it waits for next determination. If at 406, C is not greater than D×B, it is determined that the whole file should not be replicated, and the method returns to 402, where it waits for next determination.

At 412, in response to determining that the device is not in a secure zone, it is determined whether replicating summary is applicable. For instance, if the device is not in a secure zone, a whole file would not be replicated because the file may contain sensitive information, or such information that should be protected. If so, at 414, the summary is replicated. Otherwise, the method returns to 402, and waits for next case of determination.

In response to determining that the whole file should not be kept, for example, whether because the device is not in a secure zone and/or because the bandwidth and/or power capability is not sufficient, only a delta file is downloaded/uploaded for synchronizing. On the other hand, if it is determined that the whole file should be replicated (downloaded/uploaded to the device being synchronized), it may be further determined whether the delta file should also be kept. If so, both the complete updated file (whole file) as well as the delta file (updates) are downloaded/uploaded. In the present disclosure, the terms delta, update, and change are used interchangeably.

Figure 5A:
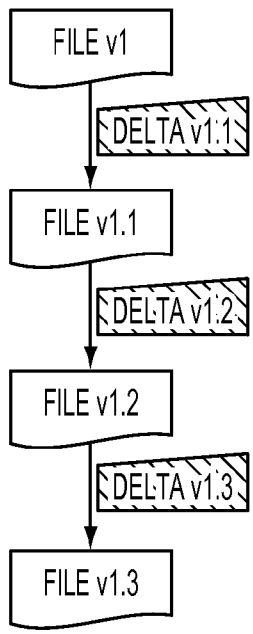
FIGS. 5A, 5B, 5C, 5D illustrate examples of different approaches for maintaining a file version.

FIGS. 5A, 5B, 5C, 5D illustrate examples of different approaches for maintaining a file version. The examples show multiple approaches to maintaining four versions of a file. FIG. 5A shows keeping complete copies of an updated version at each stage. For instance, File v1.1, which is an updated version of File v1 with changes in Delta v1.1 is kept at stage 1. Similarly, File v1.2, which is an updated version of File v1.1 with changes in Delta v1.2 is kept at stage 2. Likewise, File v1.3, which is an updated version of File v1.2 with changes in Delta v1.3 is kept at stage 3.

Figure 5B:
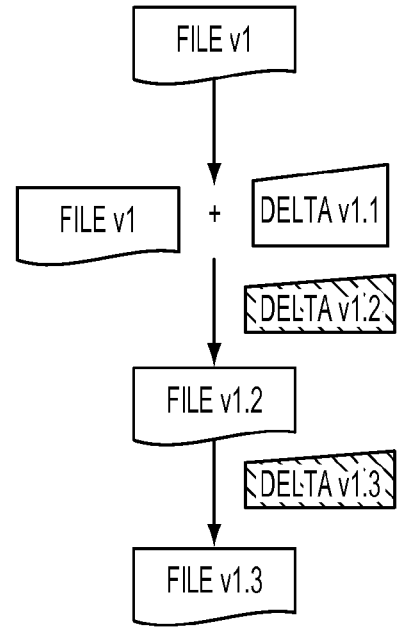

FIG. 5B shows mixed approaches taking place at different versioning stages. For instance, File v1 and its delta, Delta v1.1 is kept at stage 1. Then in the next versioning stage, referred to as stage 2, only file v1.2, which is an updated version of File v1 with Delta v1.1 and Delta v1.2 is kept. At stage 3, again, only a complete copy of file, File v1.3, which is an updated File v1.2 with Delta v1.3 is kept.

Figure 5C:
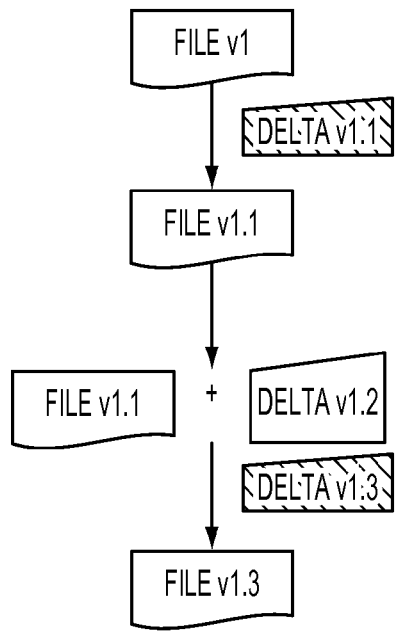

FIG. 5C shows another combination approach at different versioning stages. For instance, File v1.1, which is an updated version of File v1 with Delta v1.1, is kept at versioning stage 1. At versioning stage 2, both File v1.1 and Delta v1.2 is kept. However, in the next versioning state, only File v1.3, which is File v1.1 updated with Delta v1.2 and Delta v1.3, is kept.

Figure 5D:
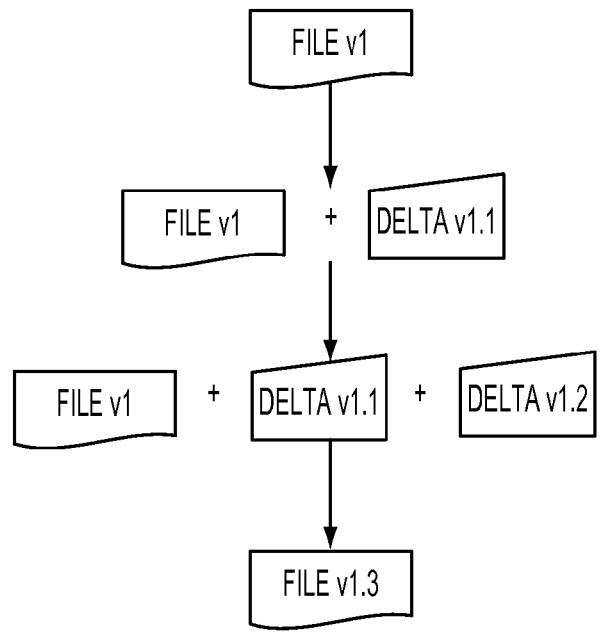

FIG. 5D shows an approach that keeps an original version and deltas at some stages and only a complete copy at others. For instance, at stage 1, File v1 and Delta v1.1 is kept. In the next versioning stage, File v1, Delta v1.1 and Delta v1.2 is kept. In the subsequent stage, File v1.3 is kept, which is file updated of File v1 with Delta v1.1 and Delta v1.2.

A choice may include keeping delta (changes only), complete copy, or both. Each approach may require different storage, network bandwidth, central processing unit (CPU) cycle capacity. In one embodiment of the present disclosure, choices (e.g., to keep delta, complete copy or both) may be determined, e.g., by examining one or more properties associated with a device and its environment such as the sizes of the file and the delta, network, storage, CPU cycle and battery condition of mobile devices.

Figure 6:
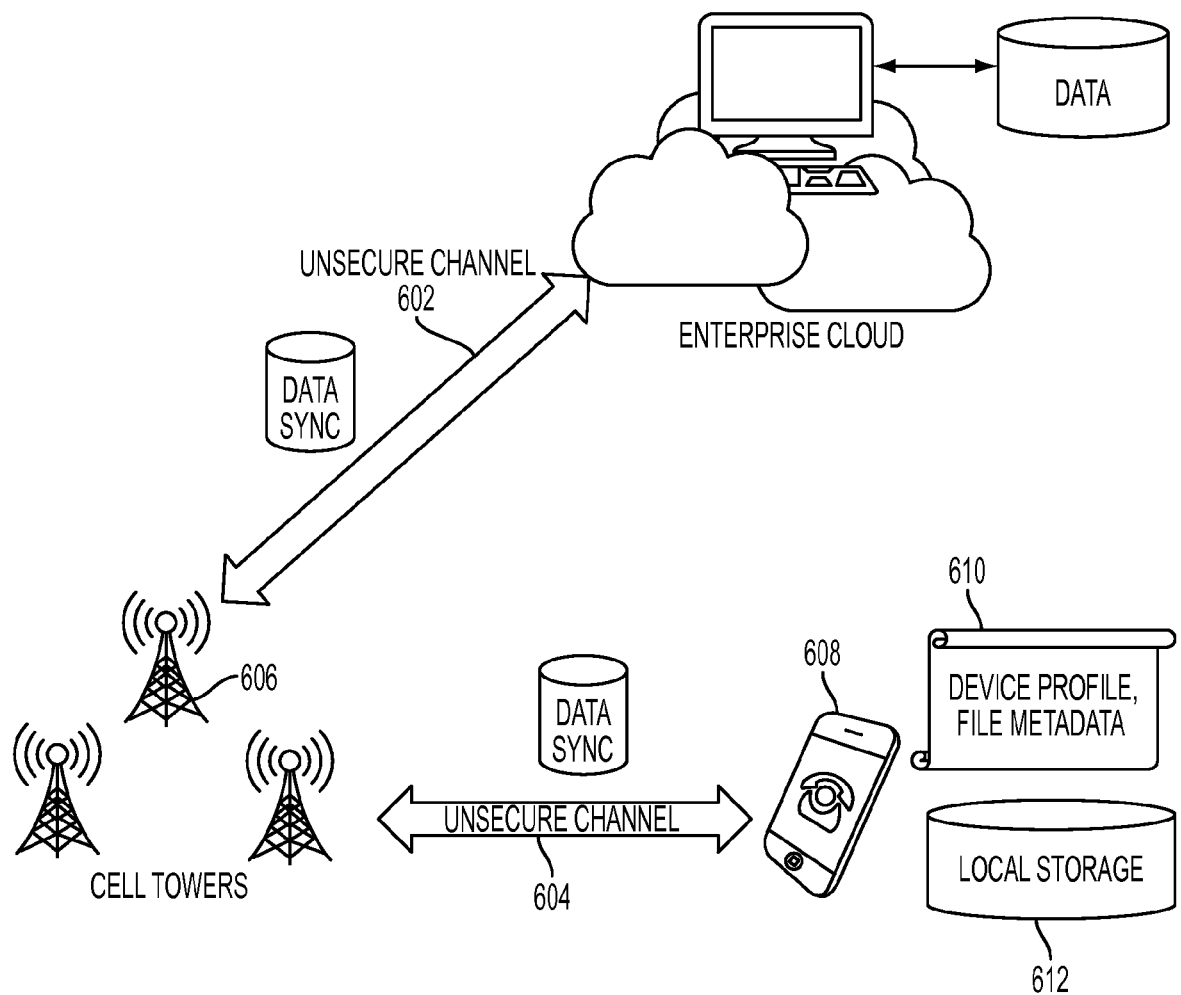
FIG. 6 illustrates an example use case in one embodiment of the present disclosure.

FIG. 6 illustrates an example use case in one embodiment of the present disclosure. The example network and device environment shown in FIG. 6 has unsecure channels 602, 604, unsecure environment 606, limited battery at device 608 and limited network bandwidth. Based on this environment setup or condition, e.g., determined based on knowledge of the current network environment and information stored in metadata as well as device profile 610, a methodology of the present disclosure in one embodiment may make the following decisions in versioning: upload new files to increase availability, remove confidential file from local storage 612, only synchronized summary for large files, synchronize delta instead of full version of a file.

Figure 7:
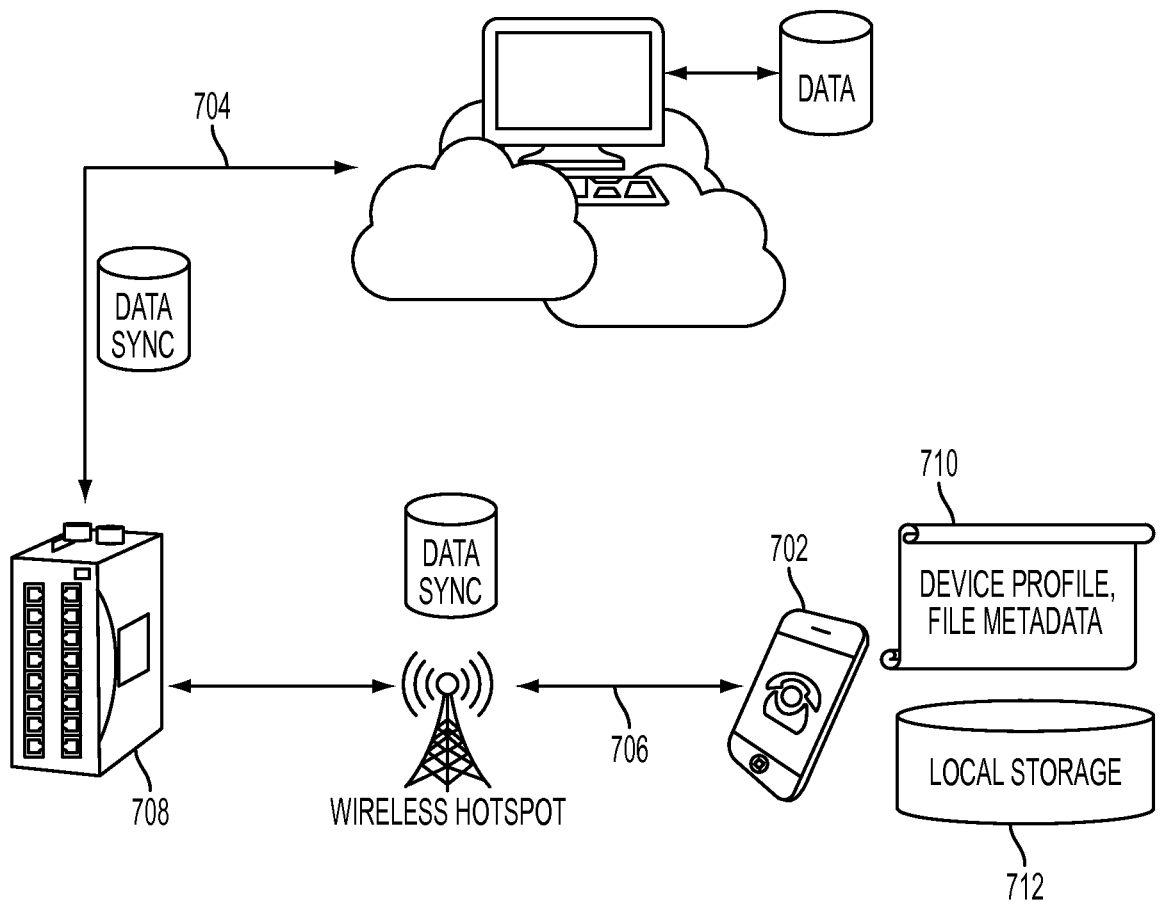
FIG. 7 illustrates another example use case in one embodiment of the present disclosure.

FIG. 7 illustrates another example use case in one embodiment of the present disclosure. In this example, the networking environment of a mobile device 702 includes a secure channel 704, 706 secure environment 708, fully charged battery at the device 702 and sufficient network bandwidth (e.g., determined to be within a threshold). Given this setup, e.g., determined based on knowledge of the current network environment and information stored in metadata as well as device profile 710, a methodology of the present disclosure in one embodiment may make the following decisions in versioning: prefetch files to local storage 712 if a number of users has accessed the files, schedule file synchronization based on user's calendar events (synchronize as much as possible before leaving this particular environment setup condition), upload a new version with complete file and delta.

Figure 8:
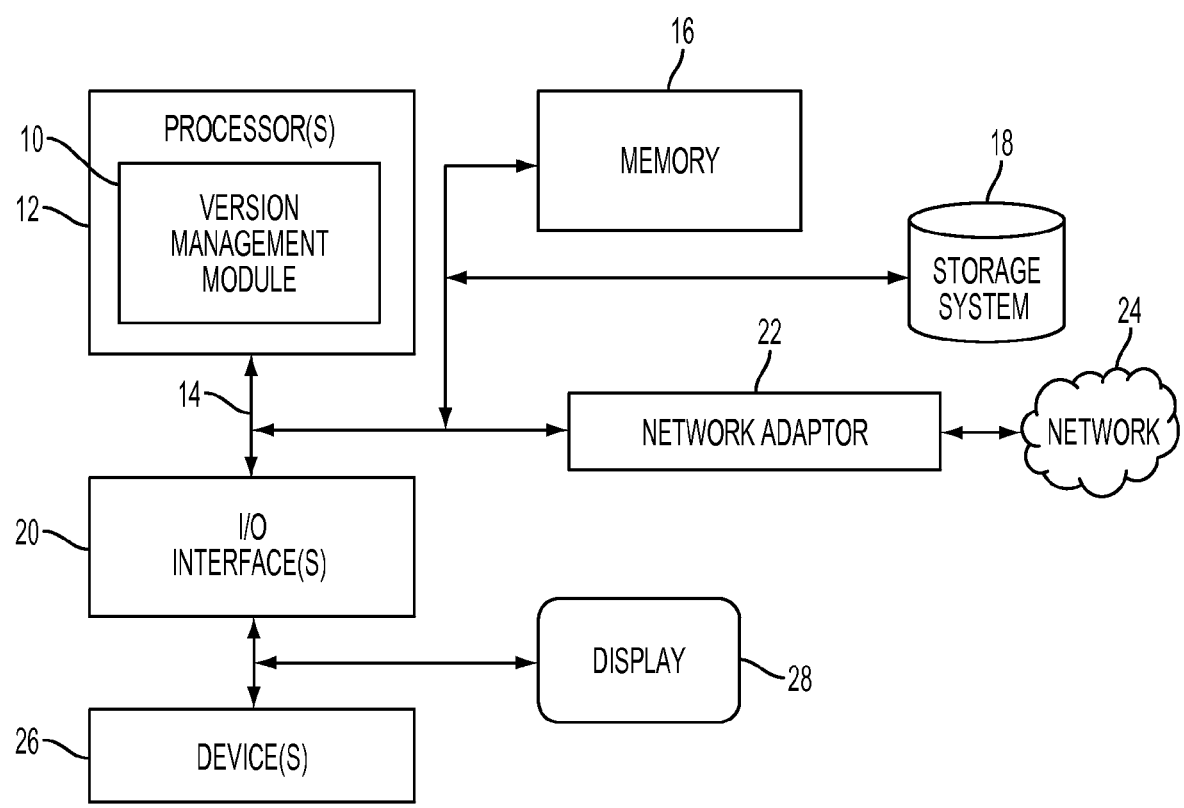
FIG. 8 illustrates a schematic of an example computer or processing system that may implement a system in one embodiment of the present disclosure.

FIG. 8 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a version management module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for metadata driven version management service, comprising:

accessing a file used in pervasive computing environment for synchronizing, by a given universal identification and storage location of the file;

extracting metadata associated with the file;

determining whether to synchronize by keeping a delta of the file locally at a device being synchronized or by keeping a whole copy of the file locally at the device being synchronized or by keeping both, based on the metadata associated with the file, one or more properties associated with the device being synchronized and one or more characteristics of the pervasive computing environment;

determining one or more version operations based on the determining of whether to synchronize by keeping the delta of the file locally at the device being synchronized or by keeping the whole copy of the file locally at the device being synchronized; and performing the one or more version operations for synchronizing the file at the device being synchronized, wherein it is determined to keep the whole copy of the file if the device is in a secure zone and the criterion $C > D \times B$ is satisfied, wherein $C$=[file size of the whole copy of the file (bit)/best available transmission rate provided by the device at current time (bits per second (bps))]
*amount of power the device uses to transmit a bit, $D$ is a configurable parameter, and
$B$ is current battery charge level of the device,
and if a user profile bandwidth is satisfied.

2. The method of claim 1, wherein the one or more version operations comprises at least one of downloading the delta of the file, downloading the whole copy of the file, uploading the delta of the file, uploading the whole copy of the file, provisioning the copy of the file stored locally at the device being synchronized, or de-provisioning the copy of the file stored locally at the device being synchronized.

3. The method of claim 1, wherein the one or more characteristics of the pervasive computing environment comprises one or more of network bandwidth, cost of data transportation, or secure state of the pervasive computing environment, or combinations thereof.

4. The method of claim 1, wherein the one or more properties of the device comprises location of the device, current battery charge level of the device, battery capacity of the device, or combinations thereof.

5. The method of claim 1, wherein the metadata comprises one or more of a type of file content, one or more versions and related deltas associated with the file, size, ownership, provenance, or redundancy of the file, or combinations thereof.

6. The method of claim 1, further comprising determining whether a summary of the file should be is created, and in response to determining that the summary of the file is to be created, generating a file summary and replicating the file summary to store locally at the device being synchronized.

7. The method of claim 1, wherein the file is synchronized at multiple devices, and different determinations can be made for different multiple devices based as to whether to synchronize by keeping a delta of the file or by keeping a whole copy of the file.

8. The method of claim 1, further comprising determining when to perform said one or more version operations based on at least one of the metadata associated with the file, one or more properties associated with the device being synchronized, or one or more characteristics of the pervasive computing environment.

* * * * *